(12) United States Patent
Morishima

(10) Patent No.: US 6,587,033 B1
(45) Date of Patent: Jul. 1, 2003

(54) MESSAGE DISPLAY CONTROL IN SELECTIVE CALL RECEIVER

(75) Inventor: Masaaki Morishima, Shizuoka (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/374,260

(22) Filed: Aug. 13, 1999

(30) Foreign Application Priority Data

Aug. 28, 1998 (JP) .............................. 10-242743

(51) Int. Cl.[7] .............................. G08B 5/22; H04Q 1/30; H04Q 7/00
(52) U.S. Cl. ...................... 340/7.55; 340/7.56; 340/7.51
(58) Field of Search .......................... 340/7.55, 7.52, 340/10.51, 5.32, 5.62, 7.43, 7.53, 7.56

(56) References Cited

U.S. PATENT DOCUMENTS

| | | | | |
|---|---|---|---|---|
| 5,043,718 A | * | 8/1991 | Shimura | 340/825.44 |
| 5,430,439 A | * | 7/1995 | Bodet et al. | 340/825.44 |
| 5,675,324 A | * | 10/1997 | Hashimoto et al. | 340/835.44 |
| 5,793,304 A | * | 8/1998 | Sone | 340/835.44 |
| 5,872,521 A | * | 2/1999 | Lopatukin et al. | 340/835.44 |
| 5,977,880 A | * | 11/1999 | Aoki | 340/835.44 |
| 6,049,323 A | * | 4/2000 | Rockwell et al. | 345/123 |
| 6,148,178 A | * | 11/2000 | Nelms et al. | 455/38.4 |
| 6,166,621 A | * | 12/2000 | Burgan et al. | 340/311.1 |
| 6,201,526 B1 | * | 3/2001 | Burgan | 345/124 |
| 6,297,726 B1 | * | 10/2001 | Yamazaki | 340/7.2 |
| 6,348,855 B1 | * | 2/2002 | Ishiguro | |

FOREIGN PATENT DOCUMENTS

| | | |
|---|---|---|
| JP | 64-65694 | 3/1989 |
| JP | 2-266620 | 10/1990 |
| JP | 2-60099 | 12/1990 |
| JP | 3-198537 | 8/1991 |
| JP | 4-207640 | 7/1992 |
| JP | 5-167507 | 7/1993 |
| JP | 7-500713 | 1/1995 |
| JP | 9-9319 | 1/1997 |
| JP | 2632604 | 4/1997 |
| JP | 10-136415 | 5/1998 |
| JP | 10-174137 | 6/1998 |
| JP | 10-313467 | 11/1998 |

\* cited by examiner

Primary Examiner—Michael Horabik
Assistant Examiner—Nam V Nguyen
(74) Attorney, Agent, or Firm—Scully, Scott, Murphy & Presser

(57) ABSTRACT

An individual selective call receiver with a display function, include a display unit displaying a data, a storage unit storing a priority display specifying data and a processor. The processor searches the message for the priority display specifying data in response to a priority display start instruction. When the priority display specifying data is searched, the processor controls the display unit to display the message such that a priority message portion of the message is displayed at a head portion of a screen of the display unit, the priority message portion including the priority display specifying data.

19 Claims, 12 Drawing Sheets

| START KEY WORD AREA | END SYMBOL AREA | TEMPORARY BUFFER 1 | TEMPORARY BUFFER 2 | LATEST MESSAGE MEMORY AREA |
|---|---|---|---|---|
| ST_KW | EOK | TEMP1 | TEMP2 | N_ME |

Fig. 7A

| ST_KW | EOK | TEMP1 | TEMP2 | N_ME |
|---|---|---|---|---|
| OOSAKA | ; | WEATHER REPORT ON JULY 1;SAPPORO-FINE;NIIGATA-RAIN;SENDAI-RAIN;TOKYO-RAIN;YOKOHAMA-CLOUDY;SHIZUOKA-CLOUDY;NAGOYA-FINE;OOSAKA-CLOUDY;HIROSHIMA-FINE;FUKUOKA-FINE;OKINAWA-FINE | OOSAKA-CLOUDY ; | |

Fig. 7B

| ST_KW | EOK | TEMP1 | TEMP2 | N_ME |
|---|---|---|---|---|
| OOSAKA | ; | WEATHER REPORT ON JULY 1;SAPPORO-FINE;NIIGATA-RAIN;SENDAI-RAIN;TOKYO-RAIN;YOKOHAMA-CLOUDY;SHIZUOKA-CLOUDY;NAGOYA-FINE;HIROSHIMA-FINE;FUKUOKA-FINE;OKINAWA-FINE | OOSAKA-CLOUDY ; | |

MESSAGE DISPLAY CONTROL IN SELECTIVE CALL RECEIVER

BACKGROUND OF THE INVENTION

1. Field of the Invention

The present invention relates to an individual selective call receiver, and more particularly to a reception message display control technique in an individual selective call receiver with a display function.

2. Description of the Related Art

An individual selective call receiver with a display unit, and a reception message received after a call number is displayed on the display unit of an LCD (liquid crystal display). Recently, a call number common to individual selective call receivers is registered, and a service using the common call number is widely spread to send data such as news and weather report for every time interval. Also, the number of common call numbers is increased to provide services of various categories data such as amusement data, economic data, and game results of various sports.

In such a reception message data, when the message data is long, e.g., the message data is over a plurality of screens of the display unit, a desired message portion truly necessary for a user is often located on the following page. For example, the message portion such the weather report and sports game results of a desired team are located in the last section of message data. In this manner, when the desired message portion is located in the last section, the user must scroll some screens.

Figure 1A:
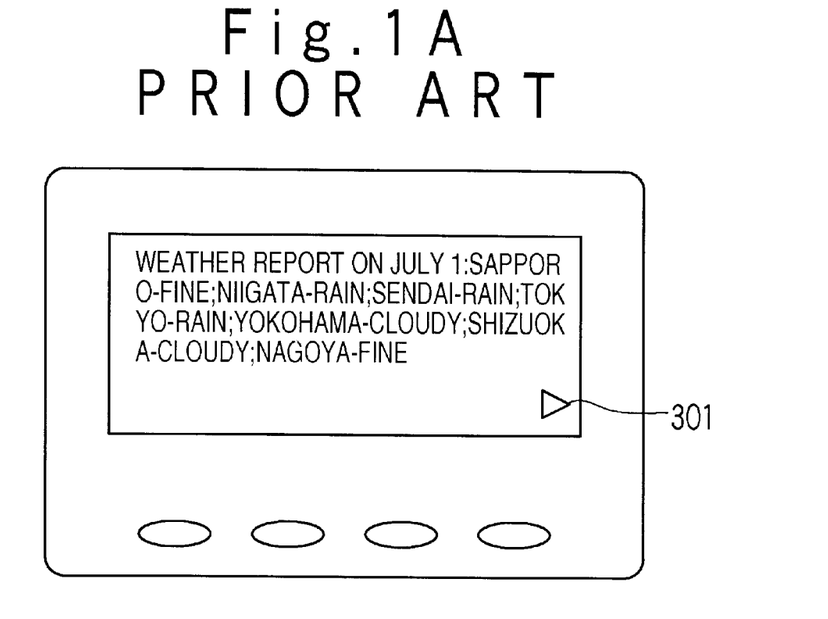
FIGS. 1A and 1B are diagrams illustrating an example of a reception message such as a weather report displayed in a conventional individual selective call receiver.
Figure 1B:
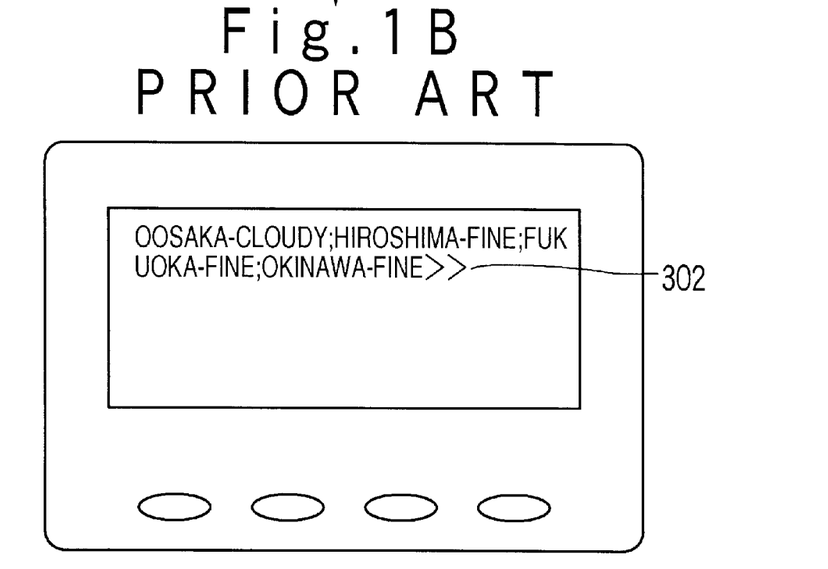

FIGS. 1A and 1B are diagrams illustrating an example of display screens of a reception message such as a national weather report in a conventional individual selective call receiver. FIG. 1A shows the first display screen or page of the reception message. A symbol 301 shows that the reception message continues the next page. FIG. 1B shows the last page of the reception message and a symbol 302 shows the end of the reception message. The symbol 301 is added on the side of the receiver in the display of the reception message and the symbol 302 is contained in the reception message. It should be noted that the symbol 302 is sometimes different from the symbol contained in the reception message. When the user wants a desired message portion, e.g., the weather report on OOSAKA, the display screen is scrolled to the next page.

In this way, in the conventional individual selective call receiver with a display function, the user must scroll the whole reception message such that a desired message portion is displayed. For this reason, it takes a long time to search the desired message portion.

Also, a quantity of information which can be displayed at once on the display unit is small in the conventional individual selective call receiver. The service in which a lot of economic data such as stock market data and exchange rate data are provided to the user is difficult in the conventional individual selective call receiver.

In conjunction with the above description, a message receiving displaying apparatus is described in Japanese Laid Open Patent Application (JP-A-Showa 64-65694). In this reference, a received message is stored in a storage unit based on a level code accompanied by the message in order of higher priority, and the messages stored in the storage unit are collectively displayed on a display unit.

Also, a selective call receiver with a display function is described in Japanese Laid Open Patent Application (JP-A-Heisei 2-60099). In this reference, the receiver is allocated with at least one common call number, and an individual call number. The receiver includes a memory area for the individual call number and a memory area for at least one common call number.

Also, a message pager is described in Japanese Laid Open Patent Application (JP-A-Heisei 2-266620). In this reference, the pager has keys for setting a call code. A user can input a call code using the keys.

Also, a selective call receiver with a display function is described in Japanese Laid Open Patent Application (JP-A-Heisei 3-198537). In this reference, specific marks are previously registered and functions corresponding to the specific marks are stored. When one of the marks is selected, a reception message is displayed based on one of the function corresponding to the selected mark.

Also, a selective call receiver is described in Japanese Patent No. 2632604. In this reference, a timer is reset to start time each time a message is received. The timer outputs a signal when a predetermined time passed. When a new message is received before the timer outputs the signal, all of messages received heretofore are temporarily stored in a memory. Then, in response to the signal from the timer, a notifying operation is started and the messages in the memory are continuously displayed.

SUMMARY OF THE INVENTION

Therefore, an object of the present invention is to provide an individual selective call receiver in which a desired message portion of a reception message can be displayed with a priority.

In order to achieve an aspect of the present invention, an individual selective call receiver with a display function, include a display unit displaying a data, a storage unit storing a priority display specifying data and a processor. The processor searches the message for the priority display specifying data in response to a priority display start instruction. When the priority display specifying data is searched, the processor controls the display unit to display the message such that a priority message portion of the message is displayed at a head portion of a screen of the display unit, the priority message portion including the priority display specifying data.

The processor may control the display unit to display the message such that a remaining portion of the message other than the priority message portion is displayed behind the priority message portion. Also, the processor may control the display unit to display the message such that the priority message portion is over-written and displayed at the head portion of the screen of the display unit.

The individual selective call receiver may further include a message memory storing the messages. In this case, the processor controls the display unit to display the message as it is and stores the message in the message memory, when the priority display specifying data is not searched.

In the above, a display format of the priority message portion is preferably different from that of a remaining portion of the message other than the priority message portion.

Also, the priority message portion is displayed at a head position or behind a title of the message.

The processor may generate the priority display start instruction in response to the reception of the message, or in response to a read instruction for instructing to read one of the messages in the message memory. The priority display specifying data is established when the receiver is turned on.

When the priority display specifying data includes a start key code and an end key code, the processor searches the message for the start key code, searches the message for the end key code, when the start key code is searched in the message, and determines that the priority display specifying data is searched in the message, when the end key code is searched in the message.

In this case, the processor moves a remaining portion of the message behind the priority message portion to produce a priority message, when it is determined that the priority display specifying data is searched in the message, and stores the priority message in a message memory.

The processor determines the start key code and the end key code in response to operations of a plurality of operation elements when a message is displayed on the display unit.

In order to achieve another aspect of the present invention, a method of preliminarily displaying a priority message portion in individual selective call receiver with a display function, include:

searching a message for a priority display specifying data in response to a priority display start instruction, and when the priority display specifying data is searched, displaying the message such that a priority message portion of the message is displayed at a head portion of a screen of the display unit, the priority message portion including the priority display specifying data.

In addition, the message may be displayed such that a remaining portion of the message other than the priority message portion is displayed behind the priority message portion.

Also, the message may be displayed such that the priority message portion is over-written and displayed at the head portion of the screen of the display unit.

Also, a display format of the priority message portion may be different from that of a remaining portion of the message other than the priority message portion. Also, the priority message portion is displayed at a head position or behind a title of the message.

The priority display start instruction may be generated in response to reception of the message, or in response to a read instruction for instructing to read one of the messages in the message memory.

When the priority display specifying data includes a start key code and an end key code, the method includes:

searching the message for the start key code;

when the start key code is searched in the message, searching the message for the end key code; and when the end key code is searched in the message, determining that the priority display specifying data is searched in the message.

A remaining portion of the message may be moved behind the priority message portion to produce a priority message, when it is determined that the priority display specifying data is searched in the message.

In the method, the start key code and the end key code may be determined in response to operations of a plurality of operation elements when a message is displayed.

DESCRIPTION OF THE PREFERRED EMBODIMENTS

Hereinafter, the individual selective call receiver of the present invention will be described below in detail with reference to the attached drawings.

Figure 2:
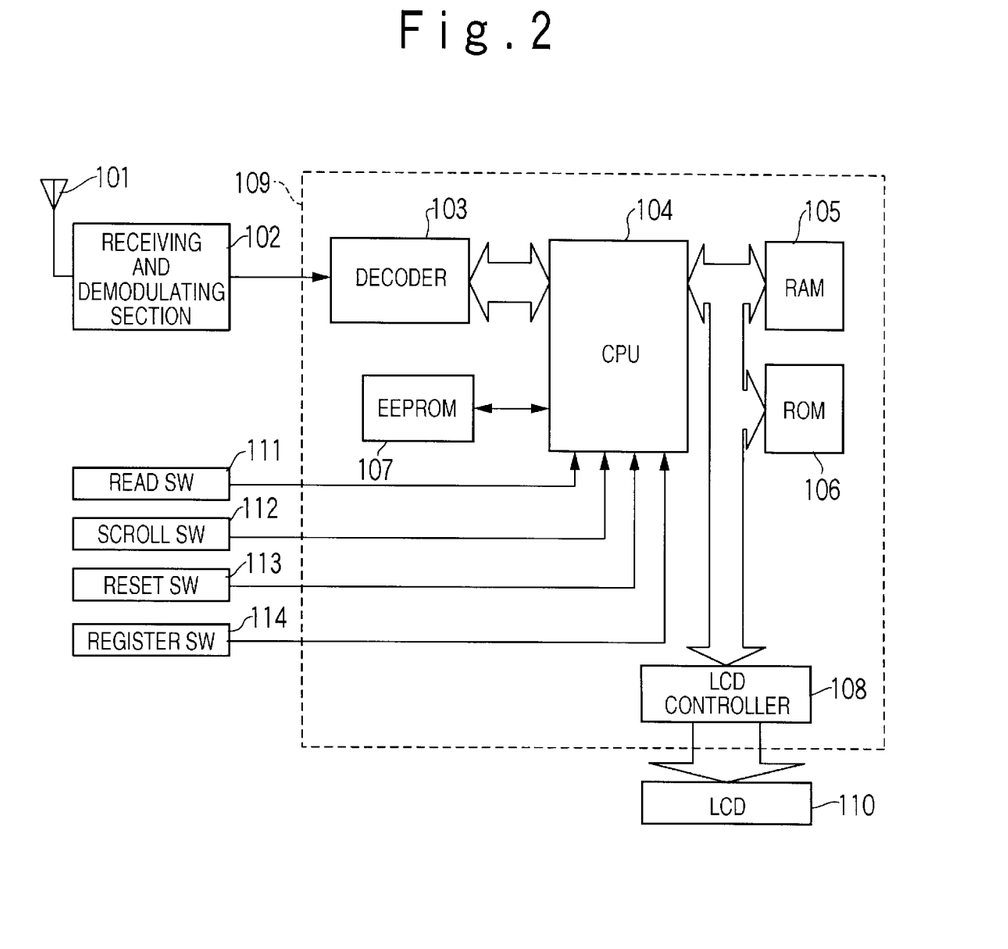
FIG. 2 is a diagram illustrating the structure of an individual selective call receiver according to an embodiment of the present invention.

FIG. 2 is a diagram illustrating the structure of an individual selective call receiver according to an embodiment of the present invention. Referring to FIG. 2, an individual selective call receiver in the embodiment is composed of an antenna 101, a receiving and demodulating section 102, a decoder 103, a CPU 104, a RAM (random access memory) 105, a ROM (Read Only Memory) 106, an EEPROM (electric erasable programmable Read Only Memory) 107, an LCD (liquid crystal display) controller 108, an LCD 110, a read switch 111, a scroll switch 112, a reset switch 113, and a register switch 114.

A radio signal is received by the antenna 101, demodulated by the receiving and demodulating section 102, and then is decoded by the decoder 103. The decoded digital signal is supplied to the CPU 104.

The CPU 104 determines whether or not a call number allocated to the receiver as a self call number is contained in the decode digital signal. The self call number is previously registered on the EEPROM 107. When the receiver is turned on or a battery cell is inserted, the CPU 104 reads the self call number from the EEPROM 107 and writes it in the RAM 105. Also, after detecting the self call number, the CPU 104 registers a reception message subsequent to the self call number on the RAM 105. Also, the CPU 104 controls the LCD controller 108 to drive the LCD 110 to display the reception message. It should be noted that a program and data for the CPU 104 are stored in the ROM 106.

The decoder 103, the CPU 104, the RAM 105, the ROM 106, the LCD controller 108 and the EEPROM 107 may be formed on a single chip LSI 109.

The read switch 111, the scroll switch 112, the reset switch 113, and the register switch 114 are provided on the same surface of the LCD 110 and are connected with the CPU 104.

The CPU 104 responds the operation of the read switch 111 to perform a control such that the reception message stored in the RAM 105 is displayed on the LCD 110. Also, the read switch 111 is used for the operation to determine a start key word character in a priority portion and an end symbol in the priority portion, in case of setting and registering of the priority portion.

The scroll switch 112 is used for a scrolling operation of the reception message displayed on the LCD 110. In addition, the scroll switch 112 is used for the operation to determine the head character and end character a start key word of the priority portion and an end symbol indicative of the end of the priority portion.

The reset switch 113 is used such that the operation mode is switched from a reception message display mode to a reception wait mode. Also, the reset switch 113 is used to stop the registering operation of the priority key word to start the reception wait mode.

The register switch 114 is used to switch the operation mode to a registration mode for registration of the priority key word at the time of the reading operation of the reception message from the RAM 105.

Figure 3:
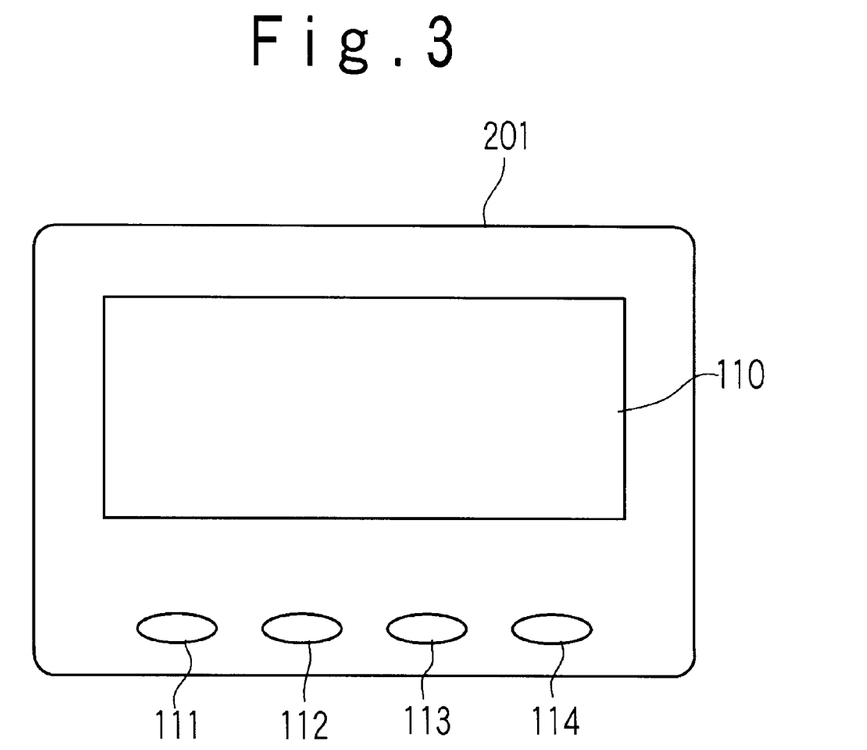
FIG. 3 is a plan view illustrating the outward appearance of the individual selective call receiver according to the embodiment of the present invention.

FIG. 3 is a plan view illustrating the outward appearance of the individual selective call receiver according to the display function in the embodiment of the present invention.

Figure 4A:
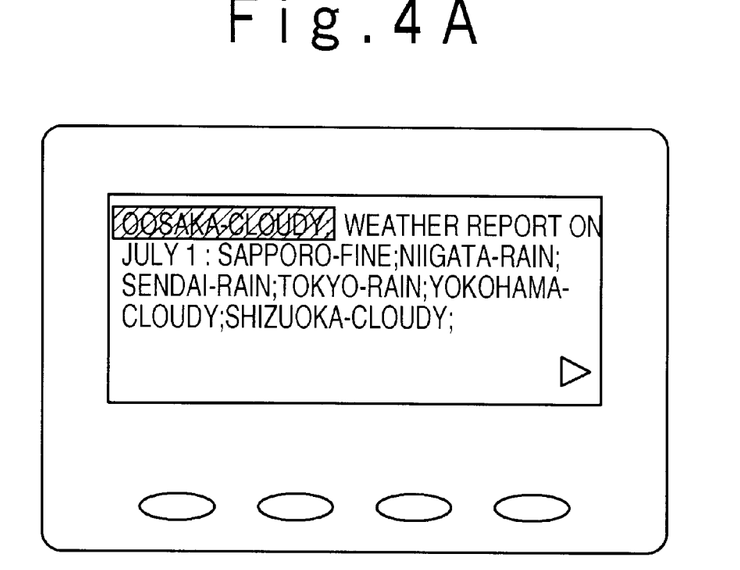
FIGS. 4A and 4B are diagrams illustrating a priority display in the individual selective call receiver according to the embodiment of the present invention.
Figure 4B:
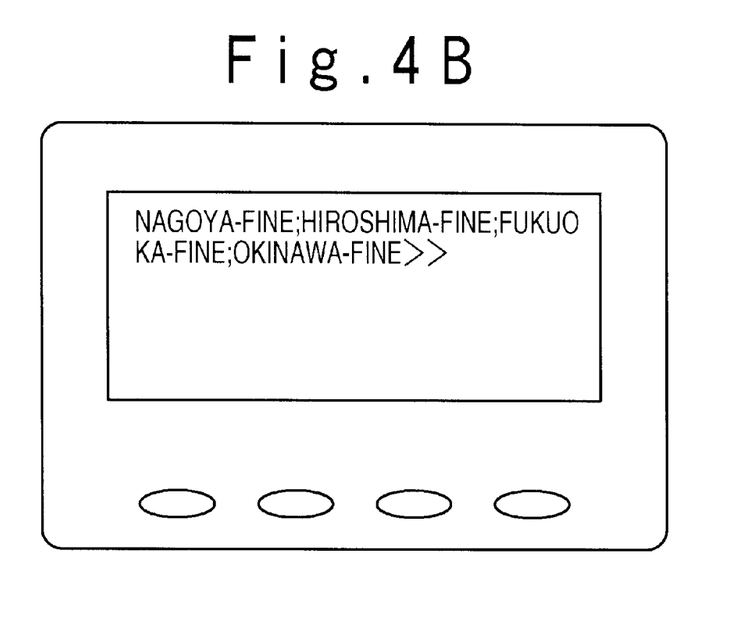

FIGS. 4A and 4B show an example of the display when a priority key word function is used in the embodiment of the present invention. It should be noted that the national weather report shown in FIGS. 1A and 1B is transmitted.

In this case, the portion displayed in a brightness-inverted manner, i.e., the hatching portion in FIG. 4A of "OOSAKA-CLOUDY;" is the priority portion of the reception message which is detected as the priority key word in case of the reception. The priority portion of "the OOSAKA-CLOUDY" is originally located between "NAGOYA-FINE" and "HIROSHIMA-FINE" in the reception message. However, through a priority display function, the priority portion of "the OOSAKA-CLOUDY" is displayed at the head portion of the message.

It should be noted that in the example shown in FIGS. 4A and 4B, the priority portion of "the OOSAKA-CLOUDY" is displayed in the head position of the reception message. However, the priority portion of "the OOSAKA-CLOUDY;" may be displayed after the title of the reception message. That is, the priority portion of "the OOSAKA-CLOUDY;" may be arranged behind "weather report on July 1:" in FIG. 4A by the CPU 104. Also, FIG. 4B is a diagram illustrating the display screen of the last page of the reception message.

Also, the priority portion of "OOSAKA-CLOUDY" may be displayed behind "weather report on July 1:" of the reception message. In this case, "SAPPORO-FINE" and subsequent portions may be controlled not to be displayed by the CPU 104.

FIGS. 5A to 5F show an example of the display when a priority portion is registered in the individual selective call receiver according to the embodiment of the present invention.

Figure 5A:
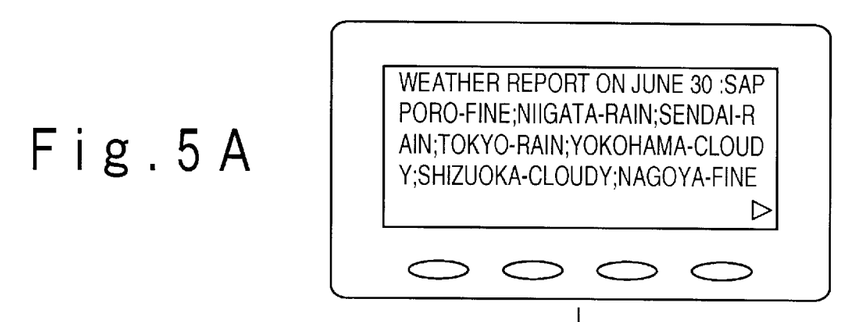
FIGS. 5A to 5F are diagram illustrating an example of the registration operation of the priority display in the individual selective call receiver according to the embodiment of the present invention.
Figure 5B:
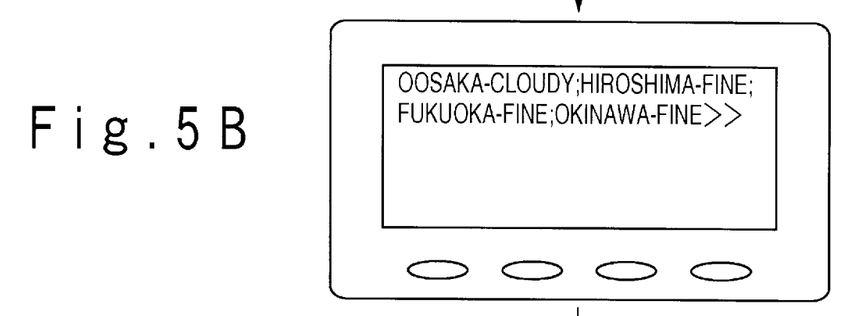

FIGS. 5A and 5B show an example of the display illustrating the screens of the pages 1 and 2 of the reception message before the priority key word registration. For example, the case where the weather report portion starting with "OOSAKA" is registered as the priority portion will be described.

Figure 5C:
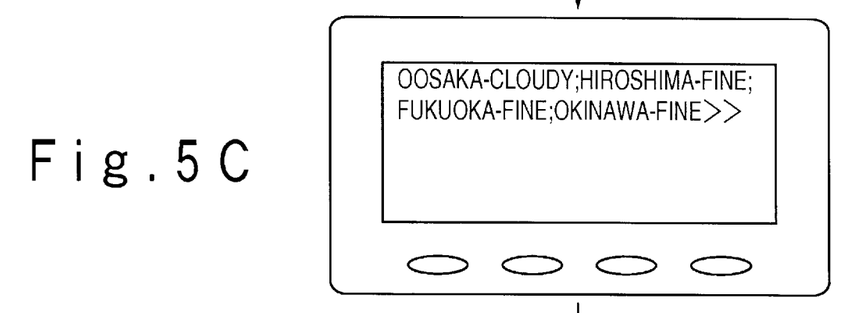

In the reception message screen in which "OOSAKA-CLOUDY" is displayed in the head position of the 1st line in FIG. 5B, the head characters of the display screen blinks in response to the operation of the register switch 114, as shown in FIG. 5C. In the example shown in FIG. 5C, "OO" are blinking. It should be noted that "OO" is "大" in Japanese and a single character.

When the scroll switch 112 is operated in this condition, the position of the blink character can be moved. Thus, the head character of the start key word in the priority portion can be selected. It should be noted that when reading switch 111 is operated, the head character of the start key word is determined. After the determination, the determined character is displayed in a brightness-inverted manner.

Figure 5D:
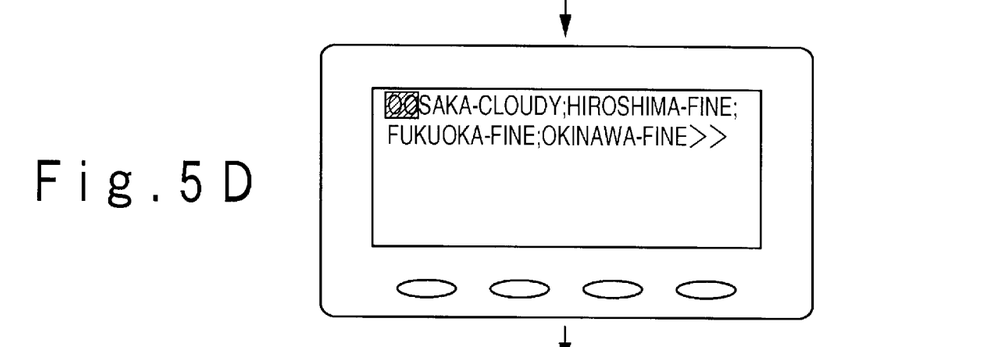

In the example shown in FIG. 5D, "OO" characters are determined and are displayed in brightness-inverted manner. Also, "SAKA" of the following character to "OO" are blinking. It should be noted that "SAKA" is "阪" in Japanese and a single character. In the state shown in FIG. 5D, when the read switch 111 is operated, the end character of the start key word is determined. In this way, the start key word in the priority portion, "OOSAKA", is determined.

Also, the sub-mode is switched to the mode to set an end symbol in the priority portion at this time. The following character "-" becomes a blink state.

Figure 5E:
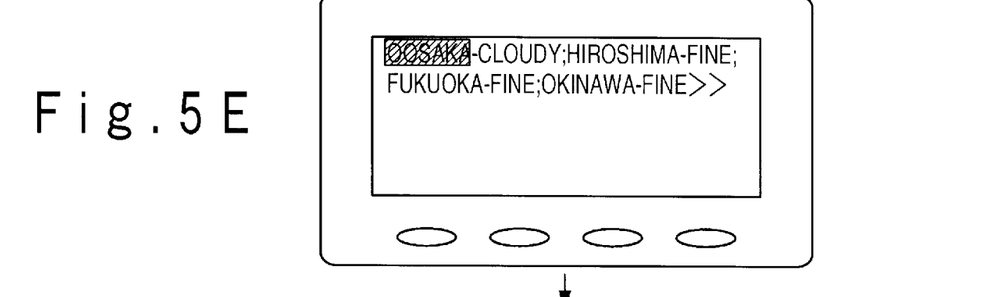
Figure 5F:
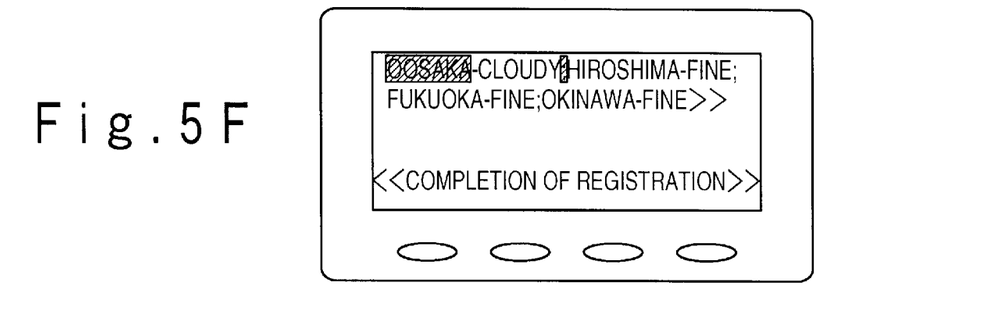

In the example shown in FIG. 5E, a blink portion is moved to a symbol ";" using the scroll switch 112. In this condition, when the read switch 111 is operated, the symbol of ";" is determined and registered. That is, a message of "completion of registration" is displayed as shown in FIG. 5F.

Figure 6:
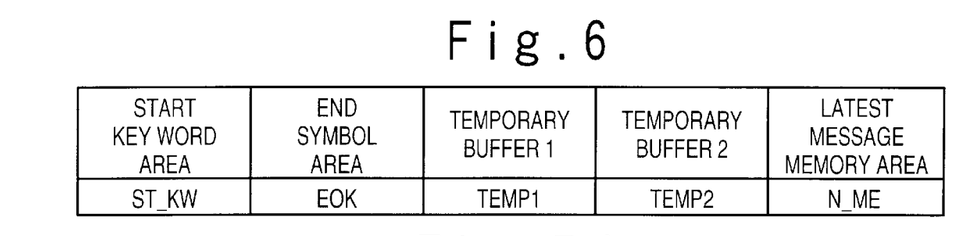
FIG. 6 is a diagram illustrating an example of a memory map of a RAM in the individual selective call receiver according to the embodiment of the present invention.

FIG. 6 is a diagram illustrating an example of the memory map of the RAM 105 in the individual selective call receiver according to the embodiment of the present invention.

Referring to FIG. 6, the memory map in the RAM 105 is composed of an area (ST_KW) in which a start key word in the priority portion is registered, an area (EOK) which an end symbol in the priority portion is registered, a temporary buffer area (TEMP1, TEMP2) used to move the priority portion to the start portion of the reception message, and a latest message memory area (N_ME) to store a final message. It should be noted that the areas other than the latest message memory area may exist in an area other than the above memory map area.

FIGS. 7A to 7E are diagrams illustrating the message in the memory area of the RAM 105 when the priority portion is searched in the reception of a message, the priority portion is re-arranged at the head portion of the reception message, in the individual selective call receiver according to the embodiment of the present invention.

First, after the registration of the priority portion shown in FIG. 5F, the start key word of "OOSAKA" and the end symbol of ";" are registered in the start key word area (ST_KW) and the end symbol area (EOK).

Figure 7A:
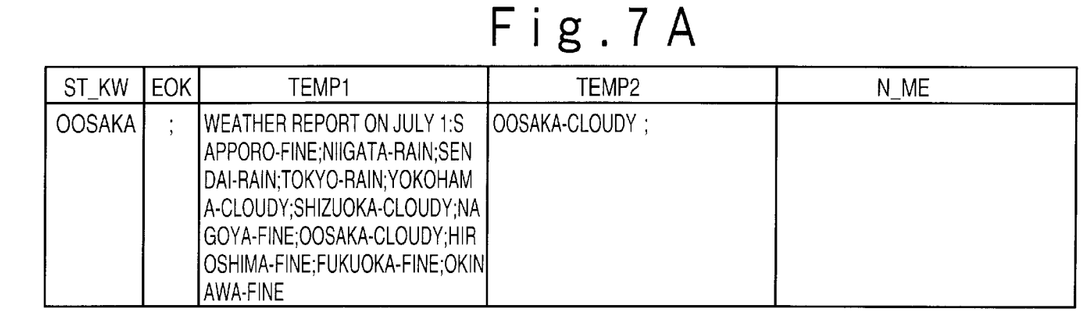
FIGS. 7A to 7E are diagrams illustrating an example of data change in a memory area of the RAM in the priority display in the individual selective call receiver according to the embodiment of the present invention.

When a message is received in the receiver, and reception interrupt is generated to the CPU 104, the reception message is temporarily stored in temporary buffer 1 (TEMP1), as shown in FIG. 7A.

In this condition, the start key word which has been previously registered on the start key word area (ST_KW), "OOSAKA", is searched for in the temporary buffer 1 (TEMP1). After this start key word is detected, the end symbol ";" which has been registered on the end symbol area is searched for in the temporary buffer 1 (TEMP1). When both are detected, a message portion of the reception message which is surrounded by the start key word "OOSAKA" and the end symbol ";" is stored in temporary buffer 2

(TEMP2). Thus, message portion of "OOSAKA-CLOUDY;" is stored in the temporary buffer 2 (TEMP2) as shown in FIG. 7A.

Figure 7B:
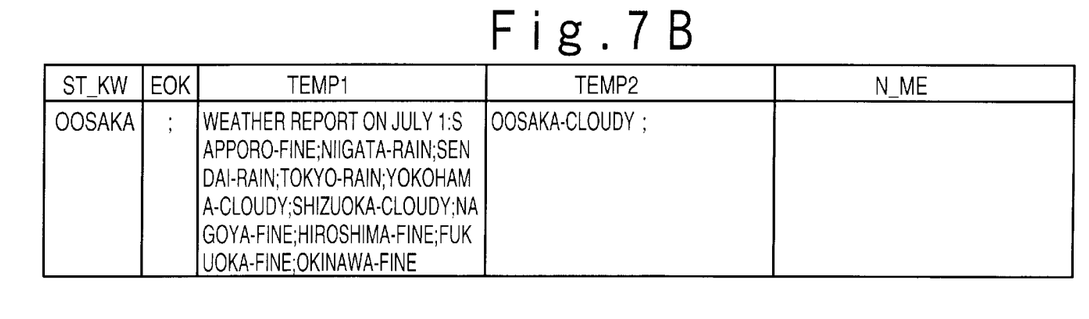

In FIG. 7B, "OOSAKA-CLOUDY;" stored in the temporary buffer 2 (TEMP2) is deleted from the temporary buffer 1 (TEMP1).

Figure 7C:
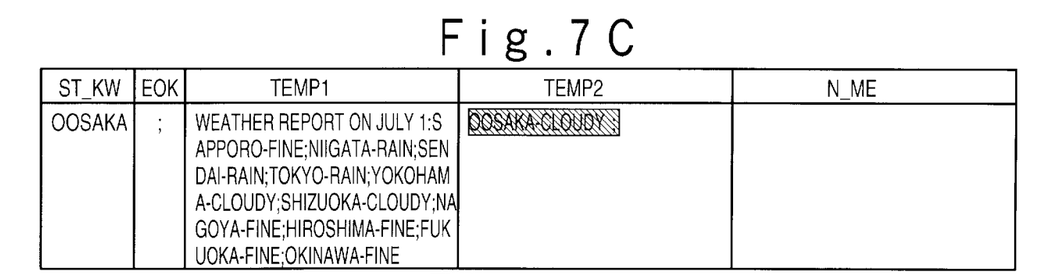

In FIG. 7C, the priority portion of the message stored in the temporary buffer 2 (TEMP2) is displayed in a brightness-inverted manner and is re-stored in the temporary buffer 2 (TEMP2).

Figure 7D:
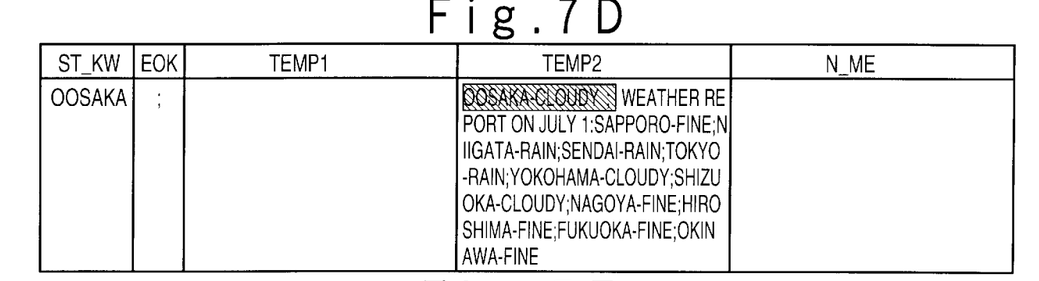

In FIG. 7D, the message portion stored in the temporary buffer 1 (TEMP1) is added behind the message portion displayed in the brightness-inverted manner in the temporary buffer 2 (TEMP2).

Figure 7E:
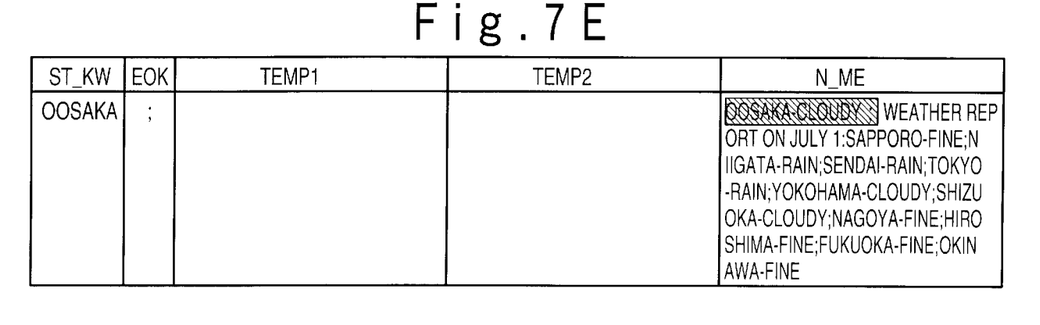

FIG. 7E shows the state in which the message stored in the temporary buffer 2 (TEMP2) is transferred to the latest message memory area (N_ME) for a message display.

Figure 8A:
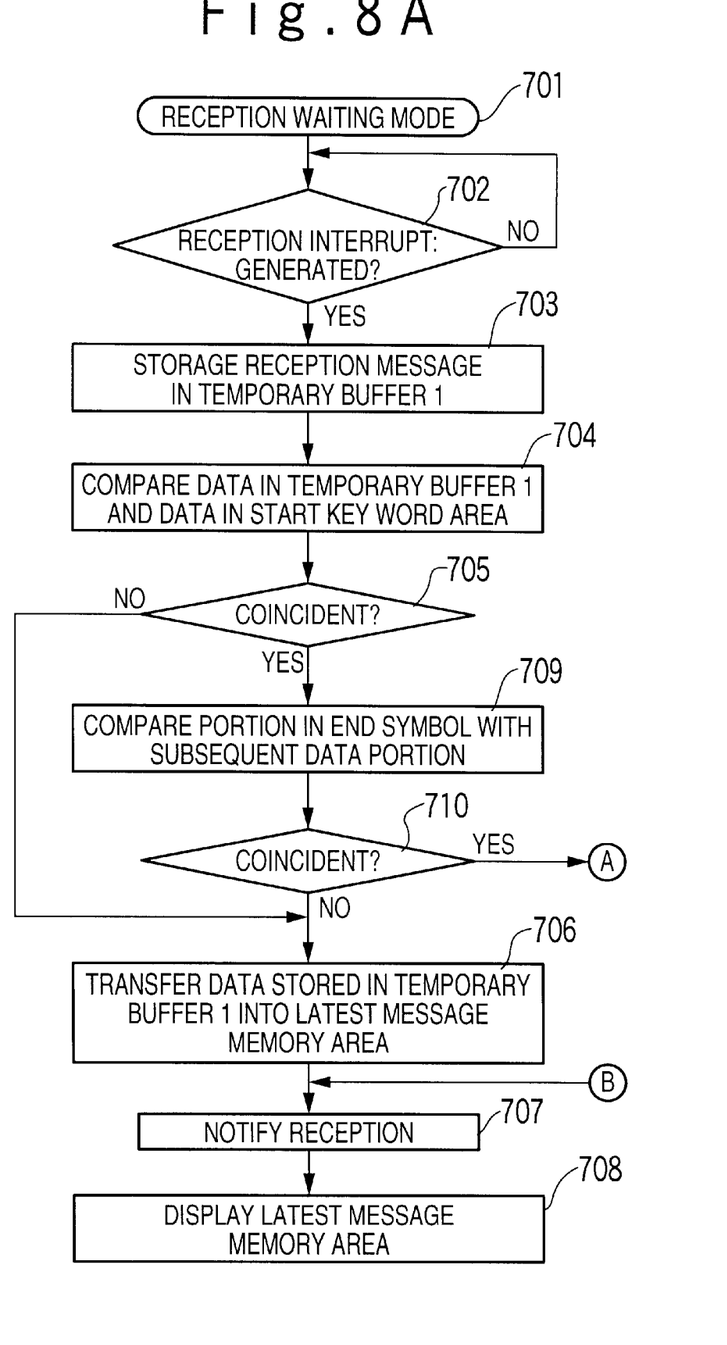
FIGS. 8A and 8B are flow charts to explain the operation of the priority display of the reception message in the individual selective call receiver according to the embodiment of the present invention.
Figure 8B:
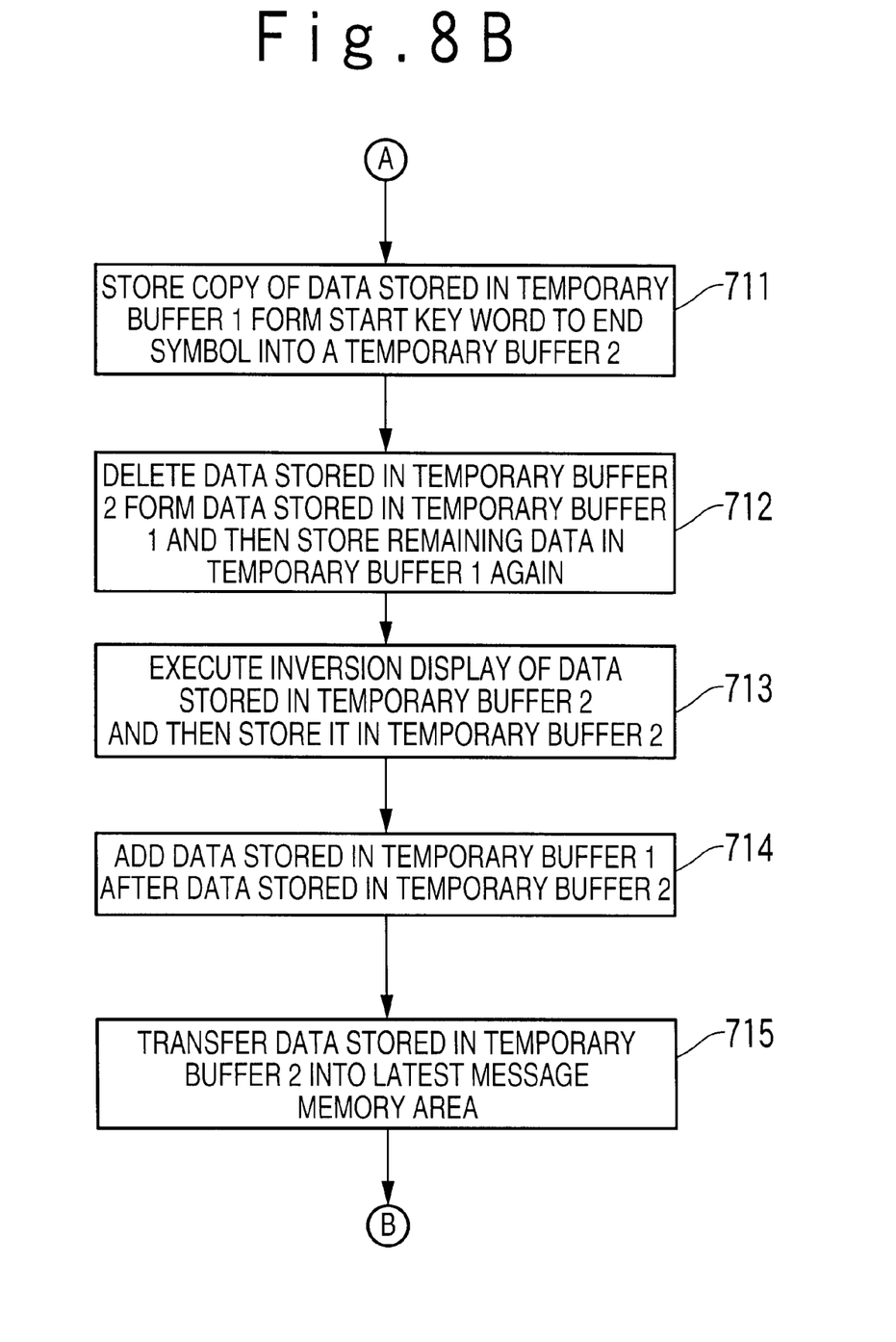

FIGS. 8A and 8B are flow charts to explain the operation of the individual selective call receiver with the display according to the embodiment of the present invention. The processing flow from a time when a reception interrupt is generated as a priority display start instruction in the message reception to a time when the reception message is displayed is shown in the figures. However, when one of message stored in the RAM 105 is read and displayed, the processing flow may be carried out in response to the read operation.

In a reception wait mode (step 701 of FIG. 8A), when the reception interrupt is generated (Yes at a step 702 of FIG. 8A), a reception message is stored in the temporary buffer 1 (TEMP1) (step 703 of FIG. 8A). Then, the reception message stored in the temporary buffer 1 (TEMP1) and the start key word which has been registered on the start key word area (ST_KW) are compared (steps 704, 705 of FIG. 8A).

When the start key word stored in the area (ST_KW) is not contained in the message stored in the temporary buffer 1 (TEMP1) (No at a step 705 of FIG. 8A), the reception message is transferred from the temporary buffer 1 (TEMP1) to the latest message memory area (N_ME) (step 706 of FIG. 8A). Then, a message reception is notified (step 707 of FIG. 8A). At the same time, the message is transferred from the latest message memory area (N_ME) to the LCD controller 108 such that the message is displayed on the LCD 110 (step 708 of FIG. 8A).

On the other hand, when the start key word stored in the area (ST_KW) is contained in the message stored in the temporary buffer 1 (TEMP1) (Yes at the step 705 of FIG. 8A), the end symbol or code registered on the end symbol area (EOK) and a portion of the message behind the start key word are compared (Steps 709, 710 of FIG. 8A). When the end symbol stored in the area (EOK) is not contained in the message stored in temporary buffer 1 (TEMP1) (No at the step 710 of FIG. 8A), the message is transferred from the temporary buffer 1 (TEMP1) to the latest message memory area (N_ME) (Step 706 of FIG. 8A). Then, the message reception is notified (step 707 of FIG. 8A). At the same time, the message is transferred from the latest message memory area (N_ME) to the LCD controller 108 such that the message is displayed on the LCD 110 (step 708 of FIG. 8A).

When the end symbol stored in the area (EOK) is contained in the message stored in temporary buffer 1 (TEMP1) (Yes at step 710), a portion of the message stored in temporary buffer 1 (TEMP1) from the start key word to the end symbol is copied to the temporary buffer 2 (TEMP2) (step 711 of FIG. 8B). The state shown in FIG. 7A shows a state after the processing of a step 711 of FIG. 8B.

In a step 712 subsequent to the step 711, a portion of the message copied to the temporary buffer 2 (TEMP2) is deleted from the data in the temporary buffer 1 (TEMP1) and the remaining portion is re-stored in the temporary buffer 1 (TEMP1). FIG. 7B shows a state after processing of the step 712 of FIG. 8B.

Subsequently, at a step 713 of FIG. 8B, the priority portion stored in the temporary buffer 2 (TEMP2) is displayed in a brightness-inverted manner and is re-stored in the temporary buffer 2 (TEMP2). FIG. 7C shows a state after processing of the step 713.

Next, at a step B714 of FIG. 8B, the remaining portion stored in the temporary buffer 1 (TEMP1) is added behind the priority portion in the temporary buffer 2 (TEMP2) to produce a new message with a priority and then is re-stored in the temporary buffer 2 (TEMP2). FIG. 7D shows a state after processing of the step 714.

At a step 715 of FIG. 8B, the new message with the priority is transferred from the temporary buffer 2 (TEMP2) to the latest message memory area (N_ME). FIG. 7E shows a state after processing of the step 715.

After processing of the step 715, the reception of the message is notified (step 707 of FIG. 8A). At the same time, the message is transferred from the latest message memory area (N_ME) to the LCD controller 108. Thus, the message is displayed on the LCD 110 (step 708 of FIG. 8A).

Figure 9A:
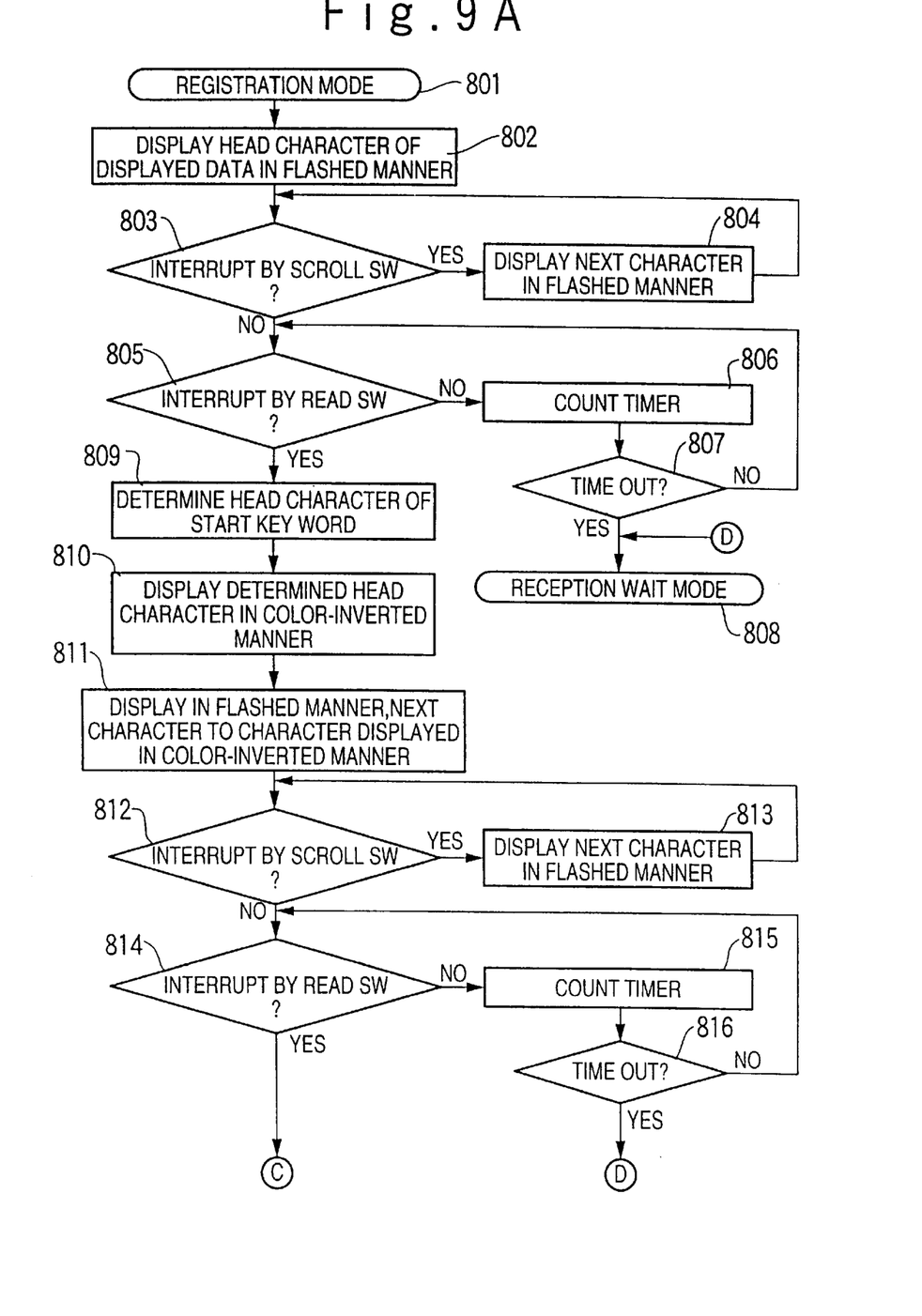
FIGS. 9A and 9B are flow charts to explain the priority display registration table operation in the individual selective call receiver according to the embodiment of the present invention.
Figure 9B:
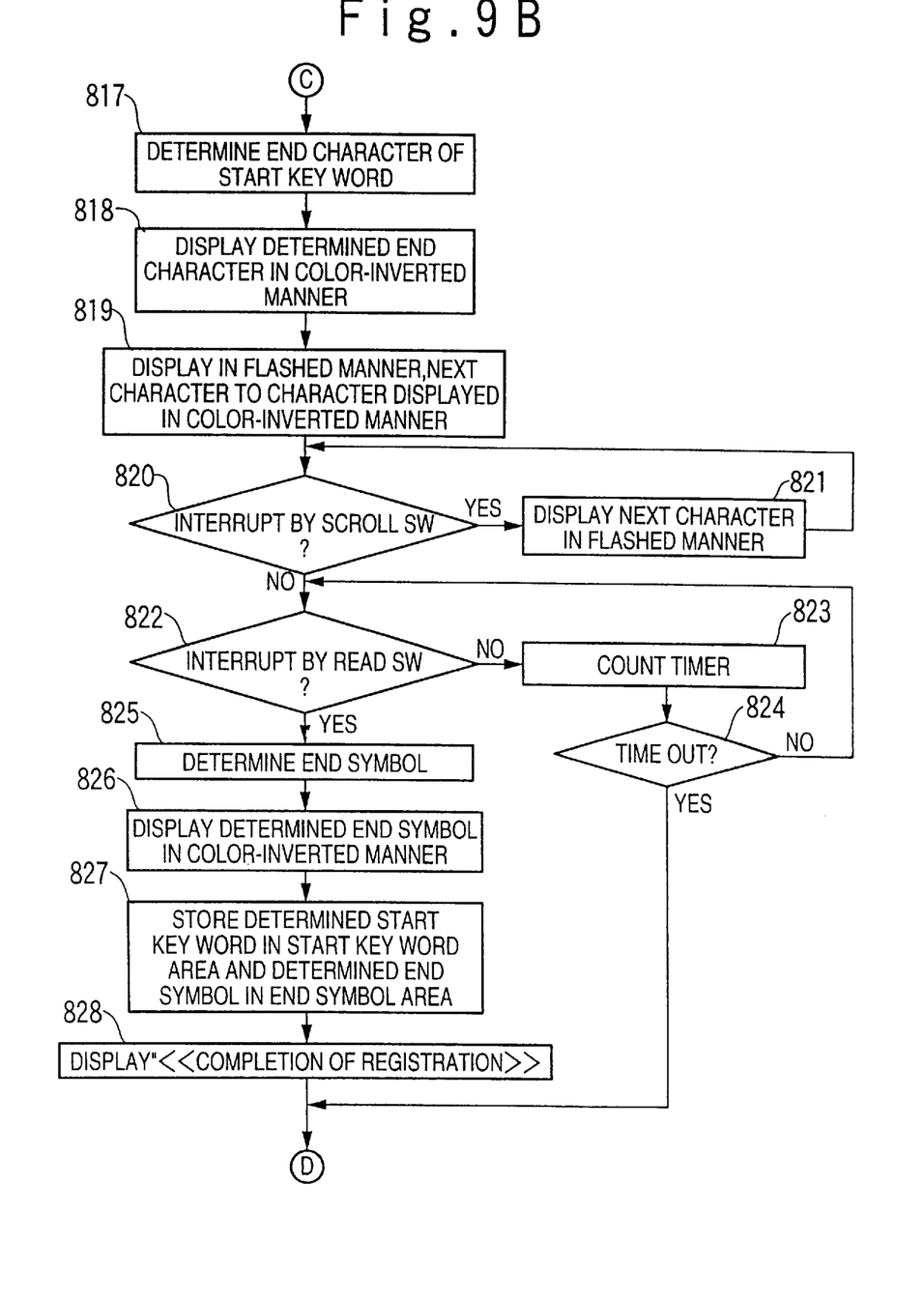

FIGS. 9A and 9B are flow charts to explain the operation of registration the priority key word in the individual selective call receiver with the display according to the embodiment of the present invention.

When a register switch 114 is operated during display of the reception message on the LCD 110, the operation mode is switched into a priority key word registration mode (step 801 of FIG. 9A).

When this mode is established, the head character of the reception message to be displayed is displayed in a blink manner (step 802 of FIG. 9A). In this state, when the scroll switch 112 is operated (Yes at a step 803 of FIG. 9A), the next character to the character to be displayed in the blink manner is displayed in the blink manner (step 804 of FIG. 9A).

Also, when the read switch 111 is operated (Yes at a step 805 of FIG. 9A), the start character of the start key word is determined (Step 809 of FIG. 9A). Then, the determined start character of the start key word is displayed in a brightness-inverted manner without the blink display.

Also, when time-out occurs without operation of any switch (Yes at a step 807 of FIG. 9A), the operation mode is switched into the reception wait mode (step 808 of FIG. 9A). It should be noted that a timer is counted at the step 806 after the operation mode is switched to the priority key word registration mode at the step 801.

After the head character of the start key word is displayed in the brightness-inverted manner at the step 810, the next character to the character displayed in the brightness-inverted manner is displayed in a blink manner (step 811 of FIG. 9A).

When the scroll switch 112 is operated (Yes at a step 812 of FIG. 9A), the next letter to the character currently displayed in the blink manner is displayed in the blink manner in place of the character (Step 813 of FIG. 9A). Also, when the read switch 111 is operated (Yes at a step 814 of FIG. 9A), the end character of the start key word is determined (step 817 of FIG. 9B). The determined end character of the start key word is displayed in a brightness-inverted without the blink display (step 818 of FIG. 9B).

Also, when the time-out occurs without operation of any switch (Yes at a step 816 of FIG. 9A), the operation mode is switched into the reception wait mode (step 808 of FIG. 9A). It should be noted that the timer is counted at the step 815 of FIG. 9A after the head character of the start key word is determined at the step 810.

Moreover, after the end character of the start key word is displayed in the brightness-inverted manner at the step 817 of FIG. 9B, the next character to the character displayed in the brightness-inverted manner is displayed in the blink manner (step 819 of FIG. 9B).

When the scroll switch 112 is operated (Yes at a step 820 of FIG. 9B), the next character to the character currently displayed in the blink manner is displayed in the blink manner in place of the character (step 821 of FIG. 9B).

Also, when the read switch 111 is operated (Yes at a step 822 of FIG. 9B), the end symbol of the priority message is determined (step 825 of FIG. 9B). The determined end symbol is switched from the blink display into the brightness-inverted display (step 826 of FIG. 9B).

Also, when the time-out occurs without operation of any switch (Yes at a step 824 of FIG. 9B), the operation mode is switched into the reception wait mode (step 808 of FIG. 9A). It should be noted that the timer is counted at the step 823 of FIG. 9B after the start key word is determined at the step 817.

At the step 827 of FIG. 9B, the start key word and the priority message and the end symbol of the priority message are stored in the start key word area (ST_KW) and the end symbol area (EOK) shown in FIG. 6, respectively (Step 827 of FIG. 9B).

After the processing of the step 827 ends, a message of "<<the registration completion>>" is displayed as shown in FIG. 5F. After that, the operation mode is switched into the reception wait mode (step 808 of FIG. 9A).

The present invention is effective in that when economic data such as stock market data of a lot of companies, exchange rate data in every country are received, it is possible to primarily display a specific one of the stock market data and a specific one of the exchange rate data.

There are a large amount of data of the economic information such as the stock market information, the exchange rate information in every country. These data changes every moment. Therefore, it is important to obtain the data in real time and to take a necessary action immediately. The display unit screen is small in the individual selective call receiver. Therefore, it is necessary to primarily display the specified stock market data and the specified exchange rate data at the head portion of the display screen.

A described above, according to the present invention, a desired message portion of each of the messages which are periodically received can be primarily displayed. Therefore, it is not necessary to see the whole message, so that the operability and convenience are improved.

In the present invention, the start key word and the end symbol are priority registered and the priority portion of the message which is surrounded by the start key word and the end symbol is displayed at the head portion of the display screen in the notification of the message reception or in the reading operation of the stored message.

Also, in the present invention, economic data such as a specified exchange rate data and a specified stock market data can be automatically selected from a lot of economic data, and primarily displayed at the head portion of the display screen. Therefore, when the use uses the individual selective call receiver with a display function, the situation judgement can be immediately carried out. Thus, the present invention is very useful.

What is claimed is:

1. An individual selective call receiver with a display function, the individual selective call receiver comprising:

a display unit displaying a message;

a storage unit storing a priority display specifying data, said priority display specifying data including a start key code and an end key code;

a processor which:

searches said message for said priority display specifying data in response to a priority display start instruction, said search for said priority display specifying data includes: i) searching said message for said start key code; ii) searching said message for said end key code when said start key code is searched in said message; and iii) determining said priority display specifying data is searched in said message when said end key code is searched in said message; and controls said display unit to display said message when said priority display specifying data is searched such that a priority message portion of said message is displayed at a head portion of a screen of said display unit, said priority message portion including said priority display specifying data.

2. An individual selective call receiver according to claim 1, wherein said processor controls said display unit to display said message such that a remaining portion of said message other than said priority message portion is displayed behind said priority message portion.

3. An individual selective call receiver according to claim 1, wherein said processor controls said display unit to display said message such that said priority message portion is over-written and displayed at said head portion of said screen of said display unit.

4. An individual selective call receiver according to claim 1, further comprising a message memory storing said messages, and wherein said processor controls said display unit to display said message as it is and stores said message in said message memory, when said priority display specifying data is not searched.

5. An individual selective call receiver according to claim 1, wherein a display format of said priority message portion is different from that of a remaining portion of said message other than said priority message portion.

6. An individual selective call receiver according to claim 1, wherein said priority message portion is displayed at a head position or behind a title of said message.

7. An individual selective call receiver according to claim 1, further comprising a receiving unit receiving said message, and wherein said processor generates said priority display start instruction in response to the reception of said message.

8. An individual selective call receiver according to claim 1, further comprising a message memory storing said messages, and wherein said processor generates said priority display start instruction in response to a read instruction for instructing to read one of said messages in said message memory.

9. An individual selective call receiver according to claim 1, wherein said priority display specifying data is established when said receiver is turned on.

10. An individual selective call receiver according to claim 1, further comprising a message memory, and wherein said processor moves a remaining portion of said message behind said priority message portion to produce a priority message, when it is determined that said priority display specifying data is searched in said message, and stores said priority message in said message memory.

11. An individual selective call receiver according to claim 1, further comprising an operation unit having a plurality of operation elements, and wherein said processor determines said start key code and said end key code in response to operations of said plurality of operation elements when a message is displayed on said display unit.

12. A method for preliminarily displaying a priority message portion in an individual selective call receiver with a display function, the method comprising:

searching a message for a priority display specifying data in response to a priority display start instruction, said priority display specifying data including a start key code and an end key code, said searching includes: i) searching said message for said start key code; ii) searching said message for said end key code when said start key code is searched in said message; and iii) determining said priority display specifying data is searched in said message when said end key code is searched in said message; and displaying said message when said priority display specifying data is searched such that a priority message portion of said message is displayed at a head portion of a screen of said display unit, said priority message portion including said priority display specifying data.

13. A method according to claim 12, further comprising:

displaying said message such that a remaining portion of said message other than said priority message portion is displayed behind said priority message portion.

14. A method according to claim 12, further comprising:

displaying said message such that said priority message portion is over-written and displayed at said head portion of said screen of said display unit.

15. A method according to claim 12, wherein a display format of said priority message portion is different from that of a remaining portion of said message other than said priority message portion.

16. A method according to claim 12, wherein said priority message portion is displayed at a head position or behind a title of said message.

17. A method according to claim 12, further comprising:

generating said priority display start instruction in response to reception of said message; and generating said priority display start instruction in response to a read instruction for instructing to read one of said messages in said message memory.

18. A method according to claim 12, wherein said displaying includes:

wherein said processor moves a remaining portion of said message behind said priority message portion to produce a priority message, when it is determined that said priority display specifying data is searched in said message; and storing said priority message in a memory.

19. A method according to claim 12, further comprising:

determining said start key code and said end key code in response to operations of a plurality of operation elements when a message is displayed.

* * * * *